United States Patent [19]

Schurr

[11] Patent Number: 4,852,238

[45] Date of Patent: Aug. 1, 1989

[54] DRUM CLOSURE AND METHOD OF MAKING

[75] Inventor: Robert E. Schurr, Harvey, La.

[73] Assignee: Robert G. Evans, Gretna, La.

[21] Appl. No.: 208,578

[22] Filed: Jun. 13, 1988

[51] Int. Cl.$^4$ .............................................. B23P 11/02
[52] U.S. Cl. ..................................... 29/453; 29/527.4
[58] Field of Search ................. 29/527.4, 453; 72/333, 72/335, 327; 220/228, 5 R, 67, 85 SP

[56] References Cited

U.S. PATENT DOCUMENTS

| 1,623,325 | 4/1977 | Wetmore | 72/327 |
| 3,923,192 | 12/1975 | Walters | 220/288 X |
| 4,706,836 | 11/1987 | Greck | 220/288 X |

Primary Examiner—Timothy V. Eley
Attorney, Agent, or Firm—Pravel, Gambrell, Hewitt, Kimball & Krieger

[57] ABSTRACT

A method for forming a threaded dispensing opening for a cylindrical drum container having a generally flat circular closed bottom, a generally flat circular closed top, and a cylindrical side wall comprising the steps of forming an aperture in the drum top and drawing the drum metal adjacent the aperture upwardly to define an upwardly extending annular shoulder. The shoulder is then compressed downwardly to thicken the shoulder and a female threaded portion is formed on the inside of the annular shoulder which is receptive of a threaded closure member.

22 Claims, 5 Drawing Sheets

DRUM CLOSURE AND METHOD OF MAKING

BACKGROUND OF THE INVENTION

1. Field of the Invention

The present invention relates to metal drums (e.g., cylindrical) of relatively thin wall thickness (e.g., 14–24 gauge), such as the standard 55-gallon steel drum and the like, and more particularly the present invention relates to an improved drum closure formed entirely from the drum stock which eliminates the need for rubber or like seal material, and the extra cost of drum closure fittings. Further, the present invention relates to an improved method of forming a drum closure, which is formed from the material of the drum top or lid portion.

2. General Background

Closures for thin wall drums normally consist of a steel bushing or flange having an internally threaded cylindrical neck with a sealing gasket therearound. At times, the neck has a laterally extending polygonal base surrounding its lowermost end. In some drum closures, a perforated container wall section overlies the neck flange and base. An upper unthreaded portion of the flange neck can be beaded outwardly over the surrounding drum stock so as to permanently secure the flange in place. This type of prior art closure is typically completed with the threaded engagement of a closure plug and the application of an overlying tamper-resisting drum seal.

The problem with prior art types of drum closures is that as the rigidity of the drum stock immediately surrounding the closure flange is diminished, a consequent reduction in resistance to turning torque occurs between the flange and the drum stock. Typically, high-torque resistance for proper seating and unseating of the closure plug is essential to good closure performance.

Various attempts have been made to improve the torque characteristics on the flange fitting insertions in light-gauge, e.g., 14–24 gauge, drums. Some manufacturers of thin wall drums have attempted to solve the problem of a suitable drum closure by providing reinforcing collars designed to overly the drum stock section immediately surrounding the flange in order to achieve necessary strength. Such a complicated solution, however, dramatically raises the cost of the drum. Indeed, the requirement of a separate flange fitting as part of the drum closure in and of itself can be a significant item of expense. The separate flange fittings can be dislodged, reducing the torque needed to turn the fitting, rendering the drum useless.

Another problem in the industry is the cleaning of drums after they are emptied. Hazardous, oily, and chemical products left in drums by the primary user create a significant pollution problem during cleaning of the drums. Many drum closures use flange fittings that are positioned to protrude inwardly and downwardly from the drum top. This protrusion prevents full emptying of the drum and the seam around the insert contain material that cannot be removed and thus contaminates the contents of the next load on reconditioned drums.

Some materials can only be removed from the drum by intense heat or burning in order to melt the contained product from the interior of the drum. This heating can destroy rubber which is often used as a seal as part of the fitting and drum stock assembly.

For containing corrosive chemicals and products, a common practice is to provide an interior coating for the drum container which is resistive to the corrosive effect of the intended content. This interior coating is traditionally called a lining. The lining must be under any drum fitting to prevent corrosive fluid from corroding or eating the drum metal under the fitting. Due to the working required to crimp the fitting in or install the fitting, the lining under the fitting is also subject to damage. Therefore the practice is to overcoat the entire fitting a second time, hoping that some of that coating, lining, paint, or the like will seal the fitting and adjacent metal. The area at the fitting is usually still inferior to the rest of the lined drum container surfaces.

Another problem is that the drum manufacturer must either inventory the fittings, or have a delay time or added expense because the manufacturer must buy pre-painted fittings.

The advantage with the present invention is that any standard head can be painted and cured and a lined head is provided in one operation, because the problems with the separate fittings do not exist. There is no crack or break around the fitting, nor is it necessary to inventory any fittings. The drum fitting of the present invention can be easily lined in a single step and without special equipment, therefore providing a superior product at a reduced cost.

U.S. Pat. No. 2,686,610, issued to E. V. Sharpnack, Sr., entitled "Metal Drum," shows a typical common metal drum as presently used in the industry. These drums are typically standardized to capacities of, for example, 15-gallon, 30-gallon and 55-gallon. Such drums are commonly used to carry an abundance of liquid products, including oil, petrochemicals, chemicals, solvents, water, and the like.

Drums are constructed of a usually cylindrical side wall and a flat circular top and a flat circular bottom. Drums usually have a relatively small three-fourths to two inch ($\frac{3}{4}''$-$2''$) threaded opening through which material can be dispensed from the drum as well as added to the drum.

An early patent which discusses a process of making metallic barrels is the Mauck et al. U.S. Pat. No. 1,095,014, entitled "Process Of Making Metallic Barrels".

An example of a prior art drum closure which uses an extra fitting mated to the drum stock can be seen in U.S. Pat. No. 4,004,709, issued to V. Simkus, entitled "Drum Closure." In the Simkus patent, a threaded closure construction is disclosed for light-gauge steel drums. The closure provides an internally threaded closure flange mechanically secured within a suitably formed container wall opening. The flange is formed with a cylindrical neck internally threaded throughout its lower extent and surrounded exteriorly by a polygonally shaped base. A resilient sealing gasket tightly surrounds the flange neck at is juncture with the flange base. A perforated drum stock section is formed to overlie and closely surround the flange neck and base in a torque-resisting manner with the upper end of the flange neck beaded outwardly over the surrounding drum stock. The closure is completed with the threaded engagement of a closure plug and application of an overlying tamper-resisting drum seal.

A liquid dispensing container construction is the subject of U.S. Pat. No. 4,032,047, issued to C. Wilson. The apparatus shows a spigot device carried by one of the end portions of a container for dispensing liquid from within the chamber, and a closeable filler device for the chamber is provided in the other of the end portions.

The Wilson U.S. Pat. No. 4,034,896, entitled "Diaphragm Controlled Garden And Orchard Sprayer," discloses a canister having upper and lower flat top portions. The top includes an upper threaded opening having a plug which attaches thereto.

U.S. Pat. No. 3,365,926, issued to Price and entitled "Manufacture Of Plate Metal Parts With Intregral Threaded Fasteners." A plate steel member having a projecting relatively long integral sleeve with concentric sleeve surfaces and a uniform sleeve thickness is made by forming a hole cylindrical throughout its length in a plate blank, extruding a sleeve from metal surrounding the hole under confined compression throughout extrusion flow of the metal, removing the pressure, and then forming a frusto-conical shaped shoulder between the internal sleeve opening and the top plate surface by further downward applied extrusion pressure which sets the metal in the sleeve. The sleeve may be threaded with true and undistorted threads having at least 75% full thread profile capable of resisting torque-tension loading without permanent deformation 30% in excess of the strength of the threads cut in the same steel and requiring a thicker sleeve wall, by removing a thin skin of work-hardened metal from the inner sleeve surface, and then roll-tapping threads by displacement of metal without metal loss throughout the length of the sleeve in the internal sleeve surface. The threaded sleeve member may be incorporated as a component of a composite metal-rubber product by molding an extrusion formed sleeve member before threading with and bonding it to the rubber, then removing the rubber flash from the interior of the sleeve at the same time that the thin skin of work-hardened metal is removed from the inner sleeve surface, and then roll-forming the threads.

The present invention is an improvement to the above patents and to the prior art, providing a simple yet effective drum closure in a light-gauge (14-24 gauge) drum using only the drum stock material, eliminating the need for extra drum flange fittings and the like thus solving the problem of drum stock to fitting torque strength, and the problem of full emptying of drums prior to cleaning and painting. Further, the present invention eliminates the problem of mating a separate flanged fitting to the drum with rubber and like seals which can be destroyed during intense heating of the drum (often associated with cleaning residuals from the drum). Since the fitting of prior art drums is a separate part, they can be easily loosened or dislodged.

SUMMARY OF THE PRESENT INVENTION

The present invention solves these prior art problems and shortcomings by providing a method and apparatus for forming drum closures in relatively thin or light-gauge drums using only the drum stock contained in the top or lid portion of the drum to form the threaded drum opening.

The method of the present invention solves this problem by first drawing the drum stock to form a generally circular disk in the top or lid drum stock, causing the drum stock to "flow" radially outwardly, thinning the center of the disk and collecting more metal at the periphery of the disk. An aperture is formed in the drum stock at the central portion of the disk. The drum metal adjacent the aperture (i.e., that metal remaining in the disk) is then drawn upwardly gradually enlarging the aperture to define an upwardly extending annular shoulder. The shoulder is then compressed downwardly to thicken the shoulder, and a female thread is formed on the inside of the annular shoulder.

In the preferred embodiment of the method of the present invention, the female thread is preferably formed on the inside of the shoulder with a thread forming tap.

In the preferred embodiment of the method of the present invention, the shoulder is preferably compressed in order to thicken the shoulder until the shoulder is at least as thick as the drum stock of the top.

In the preferred method, the annular shoulder is compressed between two die members spaced apart by a distance greater than the thickness of the drum top stock material.

In the preferred method, the drum top remains generally flat defining a horizontal drum plane and the shoulder cross-section is formed to define a generally right angle with the plane of the drum top extending upwardly therefrom so that no structure extends below the plane of the drum top. Thus, full emptying of the drum is possible.

In the preferred method, the aperture is a generally circular opening. Further, in the preferred embodiment, the shoulder is simultaneously shortened and thickened as part of the method.

In the preferred method, the radial section of the shoulder has an inner surface that is generally flat and an outer surface with a curved portion at the intersection of the drum top and the annular shoulder.

In the method of the present invention, the internal bore of the shoulder is maintained cylindrical during compression of the shoulder.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figures 1, 2:
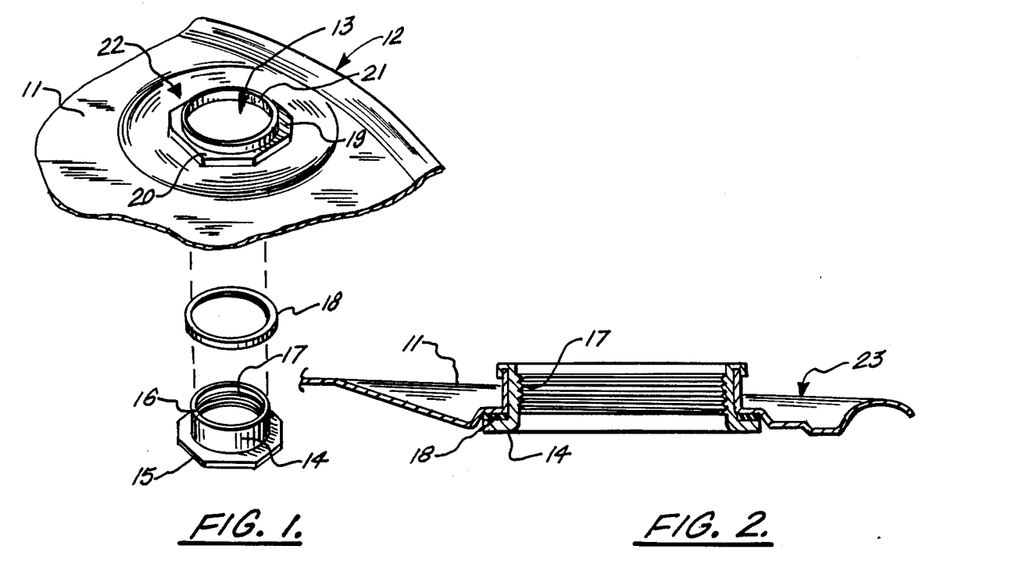
FIG. 1 is a fragmentary perspective view of a prior art type drum closure.
FIG. 2 is a sectional view of a prior art-type drum closure.

FIGS. 1-4 illustrate prior art-type drum closures. In FIG. 1, in fragmentary view, there can be seen a top 11 portion of a drum 12 having a relatively thin stock material of, for example, 16-20 gauge metal. The top 11 has a central opening 13 therethrough which forms an opening in the top 11 of the drum through which liquids can be dispensed and/or added to the drum interior as is known in the art. With the prior art fitting of FIGS. 1 and 2, a cast fitting 14 provides a polygonal base 15 portion and a cylindrical portion having internal threads 17. An elastomeric gasket 18 can be used to form a seal between the fitting 14 and the drum top 11. The top 11 is shaped to conform to the fitting having a shaped portion designated by the numeral 19 which includes a polygonal portion and a cylindrical portion 21. The drum top includes a concave or dish depression 22 which extends below the horizontal plane 23 defined by the top 11, as best seen in FIGS. 1 and 2. This presents a problem in that the drum cannot completely empty.

Another problem with prior art fittings of this type is that the elastomeric member 18 is usually made of a rubber or like material which does not withstand heat well so that when the drum is heated to remove waste material that might stuck inside, the entire drum can be destroyed because the elastomeric member 18 disintegrates or fails as a result of applied heat. Additionally, separate fittings can become dislodged or loosened reducing torque capability.

Figures 3, 4:
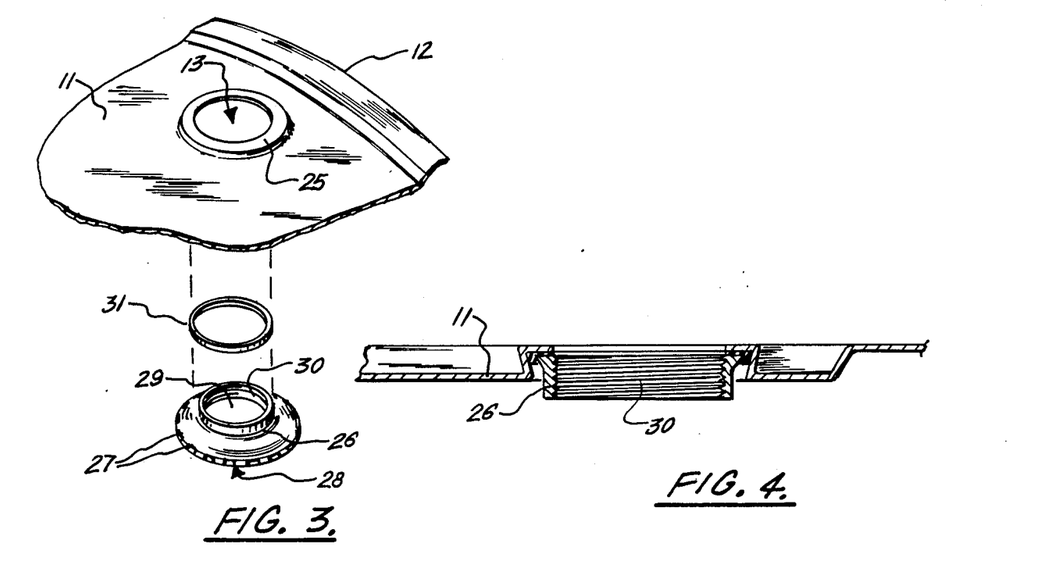
FIG. 3 is a perspective fragmentary view of another prior art-type closure.
FIG. 4 is a sectional view of another prior art-type drum closure.

In FIGS. 3-4, another prior art-type drum closure is shown which comprises a top 11 of stock material, such as 14-24 gauge steel, and wherein the drum 12 includes an upper opening 13 in the top 11. An annular upwardly extending and inwardly extending shoulder 25 forms a connection with a fitting 26 having a generally circular configuration with a plurality of spaced projections 27 extending from the fitting base, as best seen in FIG. 3. The drum top 11 is configured to fit about the fitting 26 and encrimped so that the drum stock material contained in the top 11 conform to and connect with the plurality of projections 27 extending from the circular base 28 of the fitting 26. The fitting 26 as a central opening 29 which is threaded with a plurality of female threads 30. A seal member 31 is used between the drum top 11 and the fitting to perfect a fluid-tight seal. A lining L, such as chemically resistant paint or other such lining material used to line drums, covers the drum interior including top 11, shoulder 35 and threads 37.

Figures 5, 6:
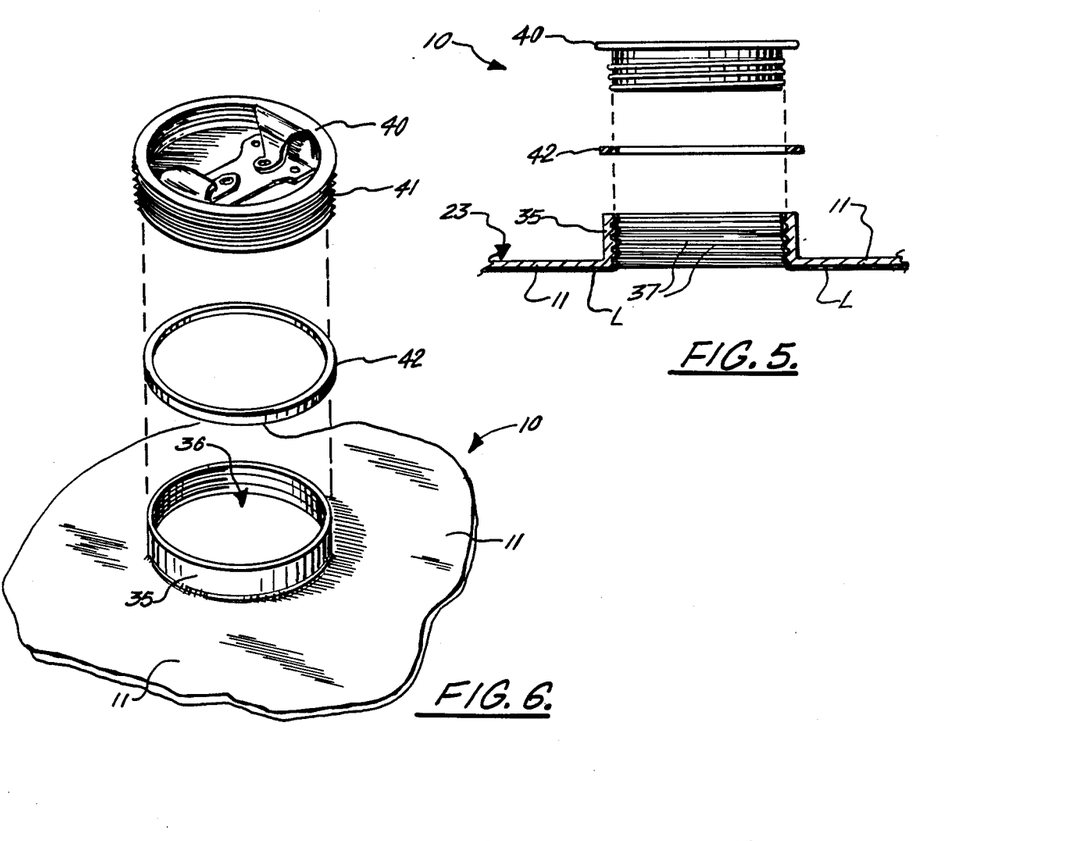
FIG. 5 is a sectional fragmentary view illustrating the preferred of the present invention.
FIG. 6 is a perspective fragmentary view illustrating the drum closure formed using the method of the present invention.
Figure 7:
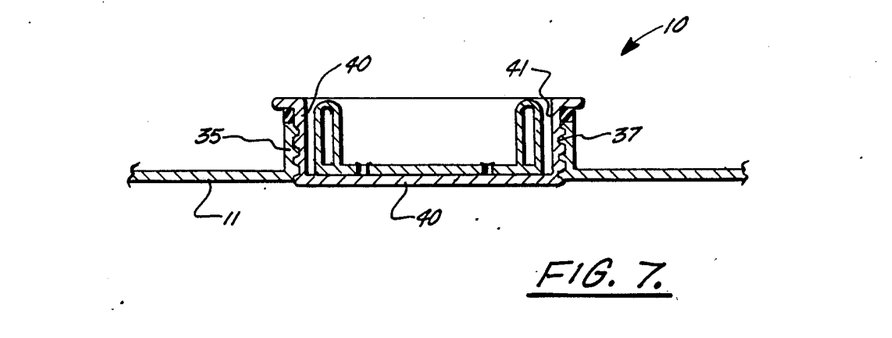
FIG. 7 is a sectional fragmentary view of the drum closure of the present invention.

FIGS. 5-7 illustrate the preferred embodiment of the drum closure of the present invention designated by the numeral 10. Drum closure 10 is formed in a top 11 portion of the drum which is a conventional drum normally of 15, 30, or 55-gallon capacity and manufactured of metal having a relatively thin gauge of, for example, 14-24 gauge. The present method forms the top 11 with a die apparatus of FIG. 8 so that an annular shoulder 35 extends upwardly from the horizontal plane 23 defined by the generally flat top 11 of the drum. With the method of the present invention, an aperture 36 is foraged in the drum stock top 11. The drum top 11 stock metal adjacent the aperture 36 is drawn upwardly away from the horizontal plane 23 of the top 11 to define an upwardly extending annular shoulder. The shoulder is compressed downwardly to thicken the shoulder so that its thickness approximates or exceeds that of the top 11 stock material. The shoulder is then threaded, preferably with a thread forming tap, to form a plurality of female threads 37 on the inside of the shoulder 35. A standard drum closure plug 40 having external threads 41 can then form a threaded sealing connection with the internal threads 37 of the shoulder 35. A gasket or other sealing member 42 can be placed between the plug 40 and the shoulder 35. Notice that no rubber gasket or like sealing material, however, is required at the interface between the shoulder 35 and the top 11 portion of the drum. Thus, the drum can be heated without fear of destroying rubber or pliable seals since the seal 42 is simply removed with the plug 40 prior to such a heating or cleaning or cleaning operation.

In the method of the present invention, a lined light-gauge metal stock drum container is formed having a generally flat circular closed bottom, a generally flat circular light-gauge closed top with an interior surface, and a continuous sidewall with a threaded dispensing opening. In the method, there is first provided an aperture in the drum stock top. In the second step, the drum metal adjacent the aperture is drawn upwardly and generally away from the top interior surface to define an upwardly annular shoulder with an inside surface that communicates with the drum top interior surface. The shoulder is compressed downwardly to thicken the shoulder and a female threaded portion is formed inside the surface of the annular shoulder. The drum metal adjacent the aperture, the annular shoulder inside surface, and the female threaded portion are simulataneously lined in the final step of the method. The lining L is thus applied to the entire drum interior surface in a single operation and without adding any separate fittings during the lining L step.

Figure 8:
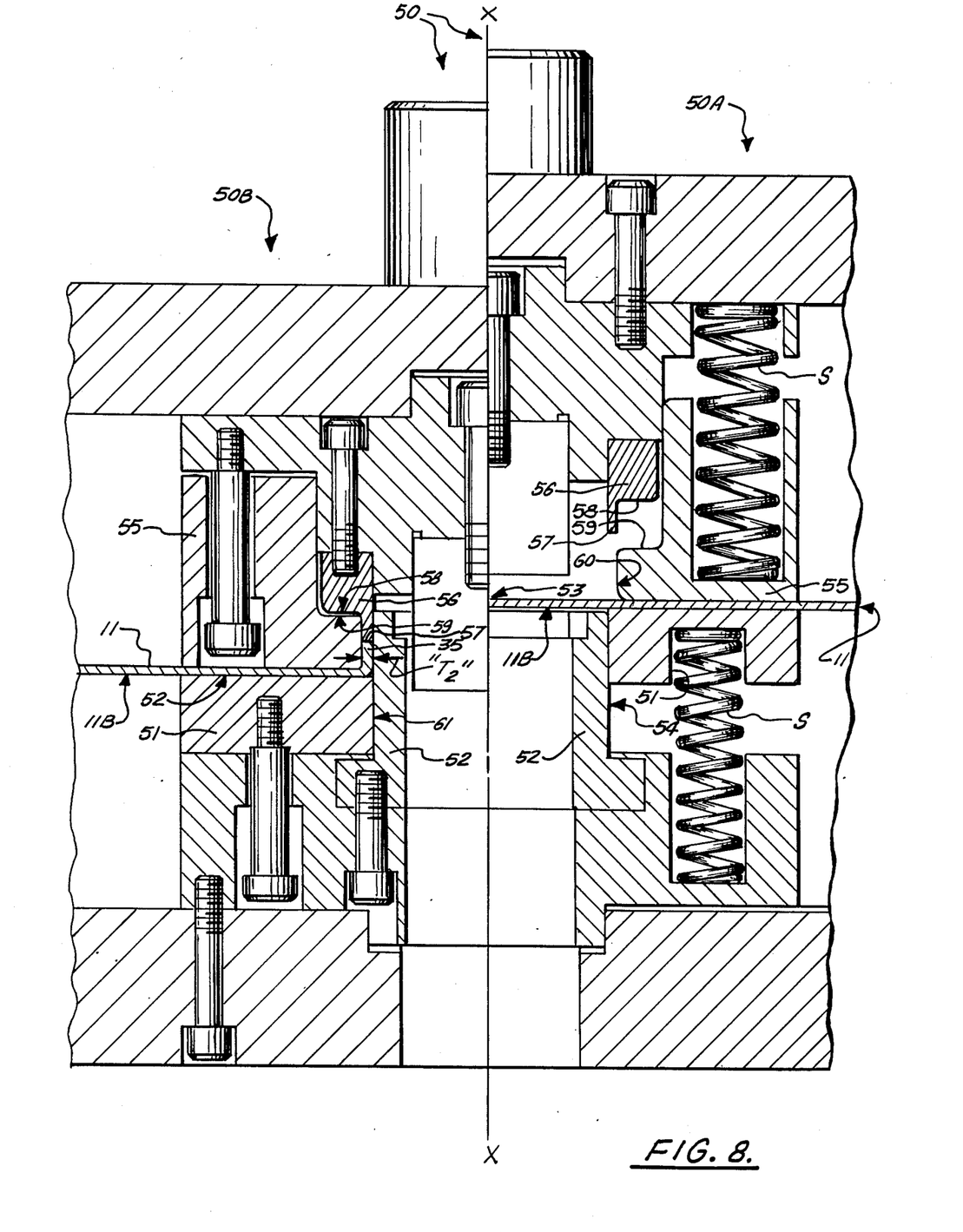
FIG. 8 is a sectional elevational view illustrating the forming die portion of the preferred embodiment of the apparatus of the present invention.

FIG. 8 illustrates the die apparatus 50 of the present invention which is used to form the drum closure 10 of the present invention. In FIG. 8, a reference line X—X divides the drawing vertically into left and right portions designated by the numerals 50A and 50B. It should be understood that the portion 50A to the right of reference line X—X illustrates the drum stock 11 of the drum top prior to formation of the annular shoulder 35, while the drawing 50B to the left side of reference line X—X shows the drum top 11 and shoulder 35 portions after formation of the shoulder.

In FIG. 8, the die apparatus 50 includes a base member B with central annular section 52, and a moving die portion that includes die sections 51 and 55. Die section 51 has a generally flat upper surface 52 which abuts the bottom 11B of drum top 11, supporting the drum top 11. Die sections 51 and 55 are positioned to slide vertically with respect to the base member B. Spring "S" can return the members 51 and 55 to an upper starting position. During operation, the members 52 and 51 move with respect to each other from the initial position shown as 50A in FIG. 8, to a final position, shown as 50B in FIG. 8, so that an inner portion of the drum top 11 is drawn upwardly forming an initial raised disk D on the drum top 11.

In FIG. 8, the center of the disk portion is designated by the numeral 53 while the peripheral edge portion of the disk is defined by the innermost face 54 of die member 51. The disk D is formed by moving the die press member 55 downwardly a small distance. After the initial disk is formed, an aperture is cut in the disk. The disk D is first formed prior to cutting in order to flow as much material as possible laterally away from the center of the disk so that material can be used to form the peripheral annular shoulder 35.

Figure 9A:
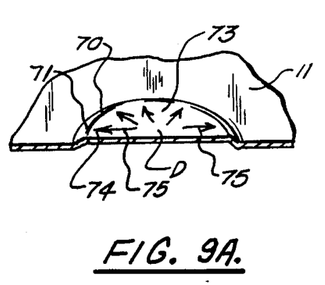
FIG. 9A-I are sequential fragmentary perspective views illustrating the method of the present invention.

The sequential steps illustrating formation of the annular shoulder 35 are seen in FIGS. 9A–9I. In FIG. 9A, the die apparatus 50 has formed an initial disk D in the drum stock on the top 11 of the drum. The disk D has a peripheral edge 70 communicating with an annular, inwardly and upwardly extending shoulder 71. A central circular flat portion of the disk 73 has a peripheral edge 74 that is integrally connected to the top edge of the annular shoulder 71. By initially drawing the drum stock in the top 11, metal can be flowed radially outwardly, the direction illustrated by arrows 75 in FIG. 9A. By flowing metal towards the peripheral edges of the disk D, more metal is available for formation of annular shoulder 35.

After disk D is formed, and metal flowed to the periphery thereof, an aperture 13 is cut in the disk, providing an inner circular edge 76. Edge 76 defines a circular opening having an initial diameter D1 smaller than the finished internal diameter of the fitting D2.

Figure 9B:
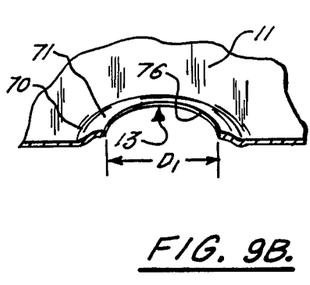
Figure 9C:
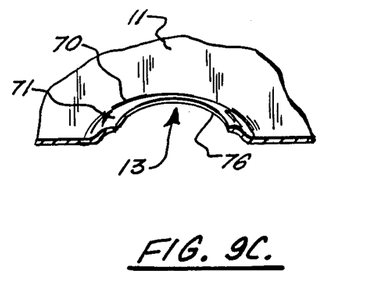
Figure 9D:
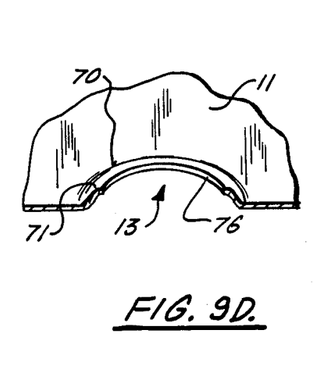
Figure 9E:
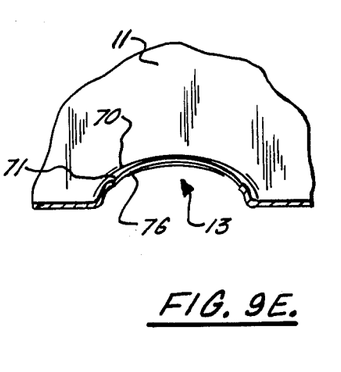
Figure 9F:
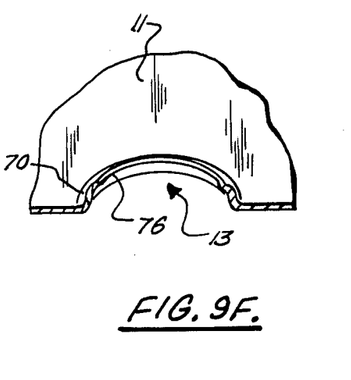
Figure 9G:
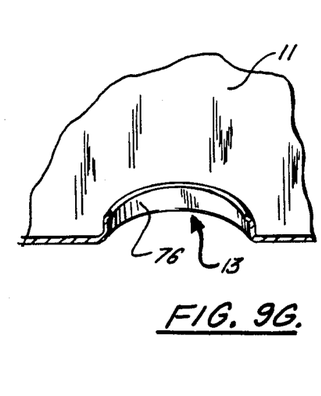
Figure 9H:
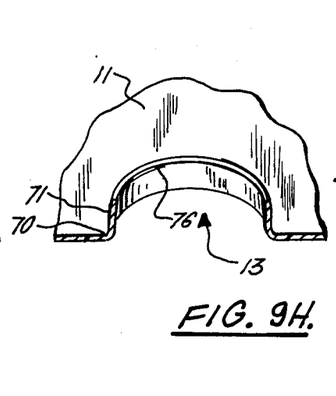
Figure 9I:
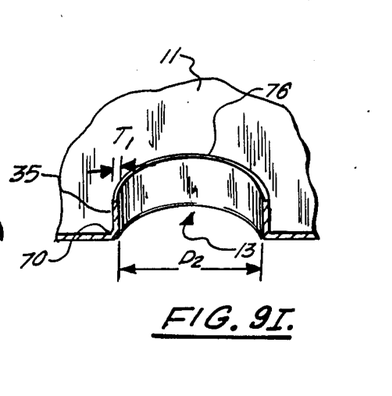

In FIGS. 9B–9H, the aperture 13 gradually enlarges as the annular shoulder gradually rises from the inwardly extending configuration of FIG. 9B to the upwardly extending configuration of FIG. 9I. Preferably simultaneously with this gradual enlargement of opening 13, shoulder 71 is being shortened so that the final annular shoulder (FIG. 9I) is thickened.

In order to thicken and shorten annular shoulder 71, vertically moving die member 56 travels downwardly from its initial raised position 50A to a lower extra sheet position 50B where surface 57 of die member 56 contacts and compresses shoulder 35. During such compression, the die members 52 and 55 define the final thickness of annular shoulder 35. Die member 56 has a flat surface 58 positioned to engage the flat surface 59 of die member 55. The surfaces 58, 59 define the limit of downward travel of die member 56 and thus the degree of vertical compression of shoulder 35.

The die member 55 has an inner surface 60 which, in combination with surface 61 of die member 52 define the lateral thickness "t" of shoulder 35, prior to threading, preferably with a thread forming tap, to form female threads 37 (see FIG. 5).

Figure 10:
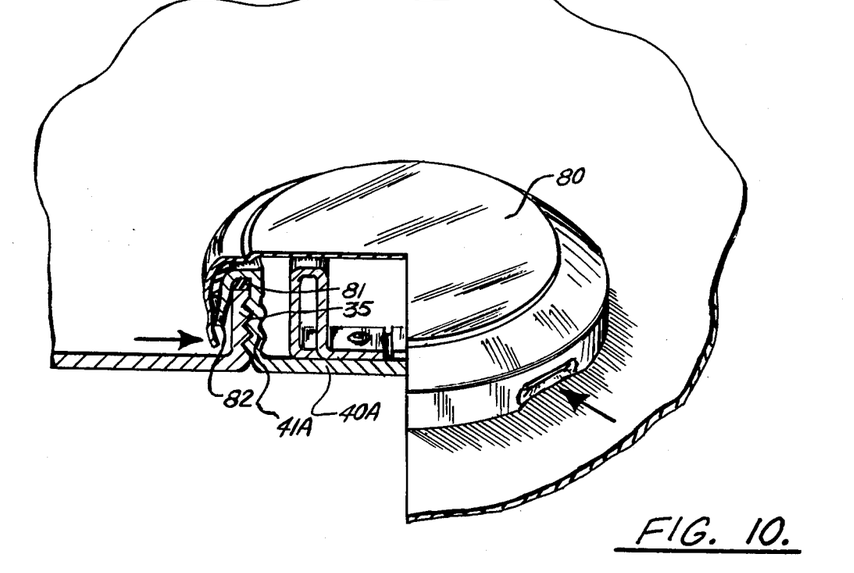
FIG. 10 is a sectional perspective view of the preferred embodiment of the apparatus of the present invention illustrating the closure cap fitting.
Figure 11:
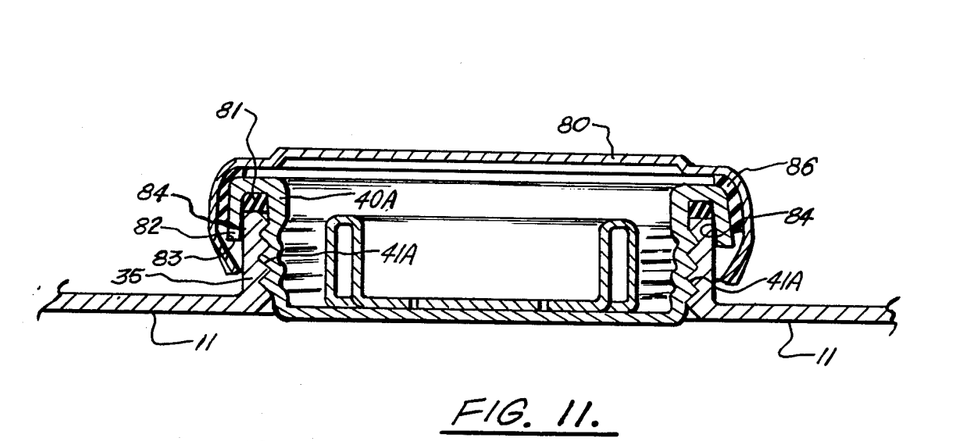
FIG. 11 a sectional view of the preferred embodiment of apparatus of the present invention illustrating the closure cap fitting.

FIGS. 10 and 11 illustrate an improved closure cap designated by the numeral 40A in FIGS. 10 and 11. Closure cap 40A includes an outer annular skirt 82 which extends downwardly to a lowermost position designated by the numeral 83 which is an annular lowermost shoulder surface. The inside surface 84 of annular skirt 82 abuts and thus reinforces shoulder 35. A rubber seal 81 perfects a fluid-tight seal between closure cap 40A and shoulder 35. A threaded connection is formed between the threads 37 of shoulder 35 and the threads 41A of closure cap fitting 40A.

Figure 12:
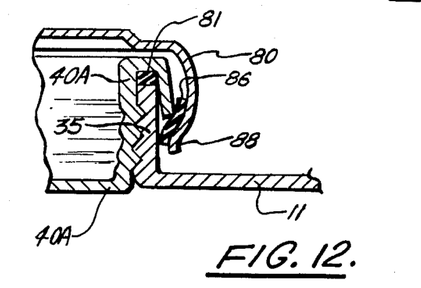
FIG. 12 a fragmentary view of another embodiment of the apparatus of the present invention.

A tamper-evident seal cover 80 is a commercially available cap which includes a seal element 86 which is annular. The seal 86 (See FIG. 12) can extend downwardly along annular skirt 82 and seal the lowermost end portion thereof at the interface of the annular skirt 82 and the shoulder 35. When the lower end portion 88 of seal 80 is crimped, a seal which is fluid-tight is formed. The tamper-evident seal 80 can be, for example, plastic or metallic.

In view of the numerous modifications which could be made to the preferred embodiments disclosed herein without departing from the scope or spirit of the present invention, the details herein are to be interpreted as illustrative and not in a limiting sense.

What is claimed as invention is:

1. A method of forming a threaded dispensing opening for a cylindrical light-gauge metal stock drum container having a generally flat circular closed bottom, a generally flat circular light-gauge closed top, and a cylindrical sidewall comprising:
   (a) forming an aperture in the drum stock top;
   (b) drawing the drum metal adjacent the aperture upwardly to define an upwardly extending annular shoulder;
   (c) compressing the shoulder downwardly to thicken the shoulder; and
   (d) forming a female thread on the inside of the annular shoulder.

2. The method of claim 1, further comprising the step before step "a" of drawing the drum stock to form a disk so that metal from the center of the disk flows toward the periphery of the disk.

3. The method of claim 2, wherein the disk is drawn upwardly to form a flat circular center portion and a peripheral shoulder portion having an upwardly and inwardly extending annular configuration.

4. The method of claim 1, wherein in step "c" the shoulder is compressed to thicken the shoulder until the shoulder is at least as thick as the top.

5. The method of claim 1, wherein in step "b" the annular shoulder is formed between two die members spaced apart by a distance greater than the thickness of the drum top stock material.

6. The method of claim 1, wherein in step "b" the drum top remains generally flat defining a drum plane and the shoulder cross-section is formed to define a generally right angle with the plane of the drum top.

7. The method of claim 1, further comprising the step between steps "c" and "d" of maintaining the drum top as a flat, planar surface during forming of the shoulder.

8. The method of claim 1, wherein in step "a" the aperture is a generally circular opening.

9. The method of claim 1, wherein in step "c" the shoulder is simultaneously shortened and thickened.

10. The method of claim 1, wherein in step "b" the radial section of the formed shoulder has an inner surface that is generally flat and an outer surface with a curved portion at the intersection of the drum top and the annular shoulder.

11. The method of claim 1, further comprising the step between steps "c" and "d" of maintaining an internal cylindrical bore on the inside of the shoulder during compression of the shoulder.

12. The method of claim 1, wherein in step "d" the thread is formed with a thread forming tap.

13. A method of forming a lined light-gauge metal stock drum container having a generally flat circular closed bottom, a generally flat circular light-gauge closed top with an interior surface, and a continuous sidewall with a threaded dispensing opening comprising:
   (a) forming an aperture in the drum stock top;
   (b) drawing the drum metal adjacent the aperture upwardly and generally away from the top interior surface to define an upwardly extending annular shoulder with an inside surface;
   (c) compressing the shoulder downwardly to thicken the shoulder;
   (d) forming a female threaded portion on the inside surface of the annular shoulder; and (e) simultaneously lining the drum metal adjacent the aperture, the annular shoulder inside surface, and the female threaded portion.

14. The method of claim 13, wherein in step "d" the thread is formed with a thread forming tap.

15. The method of claim 13, wherein in step "c" the shoulder is compressed to thicken the shoulder until the shoulder is at least as thick as the top.

16. The method of claim 13, wherein in step "e" the lining is applied to the entire drum interior surface in a single operation, and without adding any separate drum fitting during the lining step.

17. A fitted thin wall metal drum apparatus comprising:
(a) a metal drum having a generally cylindrical sidewall and two generally circular opposed end portions of a first generally uniform thickness at least one drum end portion being an integral metal sheet formed of a starting parent metal material having a first generally uniform beginning thickness of between 14 gauge and 24 gauge metal;
(b) an opening formed in a drum end portion;
(c) the opening defined by an annular shoulder integrally formed with the drum end from the parent metal material and having a thickness equal to or greater than the first, generally uniform thickness of the end portion parent metal material, the annular shoulder having an outer surface and an internal cylindrical surface adjacent the opening; and
(d) a spiralling thread member having a plurality of at least three overlapping thread portions formed by compressive displacement of metal in the annular shoulder, for forming a sealed threaded closure with a separate threaded closure member.

18. The apparatus of claim 17, wherein the threads are female threaded portions formed on the internal surface of the shoulder adjacent the opening.

19. The apparatus of claim 17, wherein the shoulder is generally cylindrical having a vertical axis that is generally perpendicular to one of the drum ends.

20. The apparatus of claim 17, wherein the drum end portions are between 14 and 24 gauge thickness metal.

21. The apparatus of claim 20, wherein the annular shoulder forms a curved wall having a wall thickness greater than the first generally uniform thickness of the drum end portion.

22. The apparatus of claim 17, further comprising a threaded closure member having external threads that can engage the overlapping threads and the closure member having an external annular skirt that extends downwardly along the outer surface of annular shoulder.

* * * * *